United States Patent [19]
Petroff et al.

[11] Patent Number: 5,226,328
[45] Date of Patent: Jul. 13, 1993

[54] VELOCITY MEASUREMENT SYSTEM

[75] Inventors: Alan M. Petroff; Larry M. Fullerton, both of Huntsville, Ala.

[73] Assignee: ADS Environmental Services, Inc., Huntsville, Ala.

[21] Appl. No.: 736,466

[22] Filed: Jul. 26, 1991

Related U.S. Application Data

[63] Continuation-in-part PCT/US 90/005721, Oct. 5, 1990, which is a continuation-in-part of Ser. No. 440,502, Nov. 17, 1989, Pat. No. 5,020,374.

[51] Int. Cl.$^5$ .............................................. G01F 1/66
[52] U.S. Cl. .............................................. 73/861.25
[58] Field of Search ............ 73/861.18, 861.25, 861.28

[56] References Cited

U.S. PATENT DOCUMENTS

| | | | |
|---|---|---|---|
| 4,790,323 | 12/1988 | Leavitt et al. | 73/861.25 |
| 4,866,613 | 9/1989 | Amemiya et al. | 73/861.25 |
| 4,944,189 | 7/1990 | Nakajima et al. | 73/861.25 |
| 4,966,153 | 10/1990 | Nakamura et al. | 73/861.25 |
| 4,995,397 | 2/1991 | Nishiyama et al. | 73/861.25 |
| 5,020,374 | 6/1991 | Petroff et al. | 73/861.25 |
| 5,031,628 | 7/1991 | Nakamura et al. | 73/861.25 |

*Primary Examiner*—Michael T. Razavi
*Assistant Examiner*—R. L. Biegel
*Attorney, Agent, or Firm*—Brumbaugh, Graves, Donohue & Raymond

[57] ABSTRACT

A sonic-type fluid flow measuring system wherein reflections or echoes of a burst 103 of ultrasonic energy from an ultrasonic acoustic emitter 9a are sensed and typically comprise a number of frequencies representative of a number of discrete velocities of flow in a volume of fluid. A receiver transducer 13a is gated to receive echoes from a selected volume of fluid 104 a selected distance from transducer 13a. Thereafter, this time domain signal sample is converted to a frequency domain sample whereby the presence and magnitude of each frequency component, or velocity component, is isolated, this being typically done by what is known as a Fast Fourier Transform unit 42a, obtaining a frequency domain waveform representative of average flow velocity. A variable noise threshold stored in register 52a is subtracted from the waveform to remove electronic noise, and the result integrated by integrator unit 54a to compensate for the return echoes returning from a slightly curved plane of the outwardly propagating wavefront. Seven of these samples are stored, and averaged by averaging-velocity translator unit 58a to obtain an average result, which is applied to averaging-velocity translator unit 58a, which averages these stored velocities and applies the result to output unit 64a for disposition.

7 Claims, 7 Drawing Sheets

VELOCITY MEASUREMENT SYSTEM

CROSS REFERENCE TO RELATED APPLICATIONS

This application is a continuation-in-part of co-pending PCT application No. PCT/US 90/005721, filed Oct. 5, 1990, which is a continuation-in-part of application Ser. No. 07/440,502, filed Nov. 17, 1989, now U.S. Pat. No. 5,020,374;

FIELD OF THE INVENTION

This invention relates generally to devices and systems for the measurement of velocity of fluid flow, and more particularly to a system utilizing a burst of ultrasonic energy in combination with the Doppler effect as a means to determine average flow velocity.

BACKGROUND ART

There are many instances where it is necessary or desirable to determine the average velocity of a cross section of a fluid, particularly as flowing through some type of containment vessel. Average velocity is needed in such an instance in order to determine volume of flow, as by simply multiplying average velocity by the cross section of fluid. However, as is well known, the velocity of flow often varies within a discrete volume, particularly as between levels of a given cross section of it, making it difficult to determine the average velocity.

One prior system, which is described in U.S. Pat. No. 4,083,246, employs an electromagnetic sensor, this being placed in the flow stream typically near the bottom of a channel of flow. Its output varies as a function of a sensed electromagnetic field, sensing being limited to the region closely adjacent the sensor, and thus it senses the velocity at its particular level in the flow. In accordance with this patent, liquid level, height of liquid, must also be sensed and the output of the electromagnetic unit modified as a function of liquid height to obtain a velocity signal which it is asserted is representative of average flow of the fluid in which the sensor is immersed.

A second type of flow velocity measurement device is of the Doppler shift type wherein an acoustic signal of a known frequency is emitted into a moving fluid, and reflected signals, particularly from objects in it, are sensed and their frequency compared with the emitted signal. With this method, a difference frequency or frequencies, Doppler frequencies, are thereby obtained, each representative of a discrete velocity. A modification of this approach employs several sensors, and their outputs are averaged.

One significant problem with electromagnetic type sensors is that accuracy often tends to fall off fairly rapidly with time of usage, particularly where there is any foreign matter which can adhere to the sensor. This is a significant problem in the case of usage in sewage lines.

A distinct problem with acoustic-type devices is that they respond to multiple acoustic reflections, each from a distinct floating object, particle, or other moving interface with the fluid, and as these reflectors may be moving at different velocities depending upon such variables as their height and/or other distance from a containment wall, a variety of velocity indicating signals are received. In the past, different approaches for selecting particular reflected Doppler signals as indicating velocity have been attempted. Perhaps the most prominent one has been that of choosing the signal having the greatest amplitude or the average frequency of several discrete highest amplitude signals. The problem with this approach is that there is no assurance that it is derived from a reflecting source or sources which yield a true average velocity. For example, the echo or echoes may be from a large object which is substantially submerged and is moving at a much less than average velocity. On the other hand, it, or they, may be from an object moving on the surface and thus at a higher than average velocity. Thus, this approach is inherently susceptible of significant inaccuracies.

It is, accordingly, the object of this invention to overcome the aforesaid and other problems relating to prior art devices and to provide an improved velocity measurement system which measures average velocity directly by utilizing pulsed Doppler techniques to determine flow.

SUMMARY OF THE INVENTION

In accordance with this invention, a liquid velocity measurement system is constructed wherein a burst of an acoustic signal of determined frequency is transmitted longitudinally or with longitudinal components into a volume of moving fluid. As acknowledged above, a typical result will be the occurrence of a variety of Doppler affected echoes which persist as the burst propagates away from the transmitter. An acoustic signal receiver is gated for a discrete interval immediately after the signal is transmitted to receive echoes generated by the signal at a selected distance from the transmitter, with the gating interval selected so as to permit echo reception from debris in a planar volume of fluid normal to the propagating burst and at the selected distance. The received signals are then filtered to remove the frequency of the transmitted signal, leaving the Doppler shifted signals, which are amplified and digitized. These digital signals are stored, and after digital signals from a selected number of gating cycles of the receiver are obtained the digital signals are translated to frequency domain signals from which average velocity of flow is computed.

DETAILED DESCRIPTION OF THE PREFERRED EMBODIMENT

Figure 1:
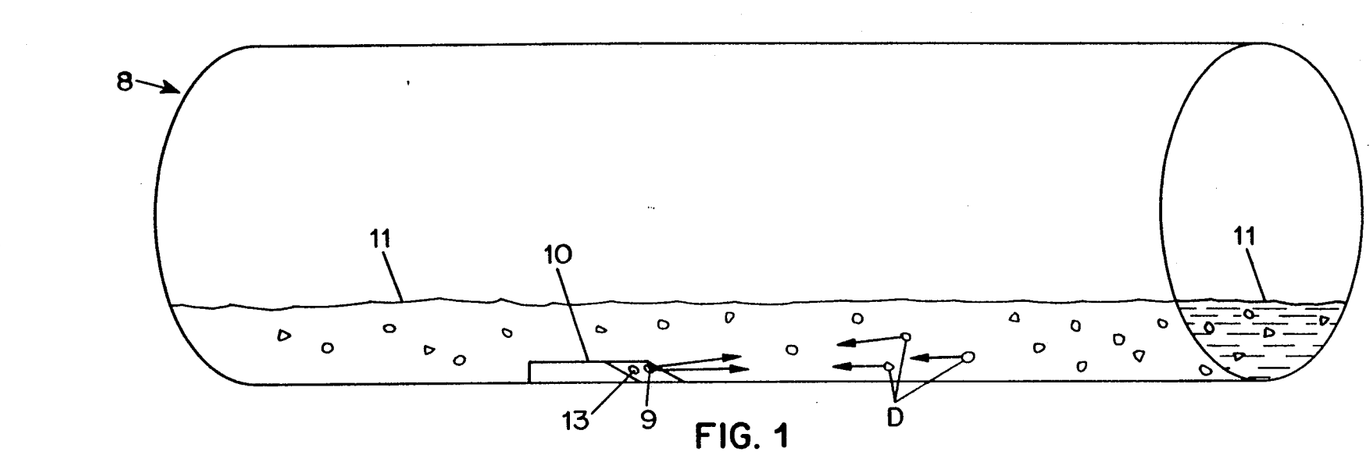
FIG. 1 is a schematic illustration of the employment of the present invention with respect to flow through a pipe.
Figure 2A:
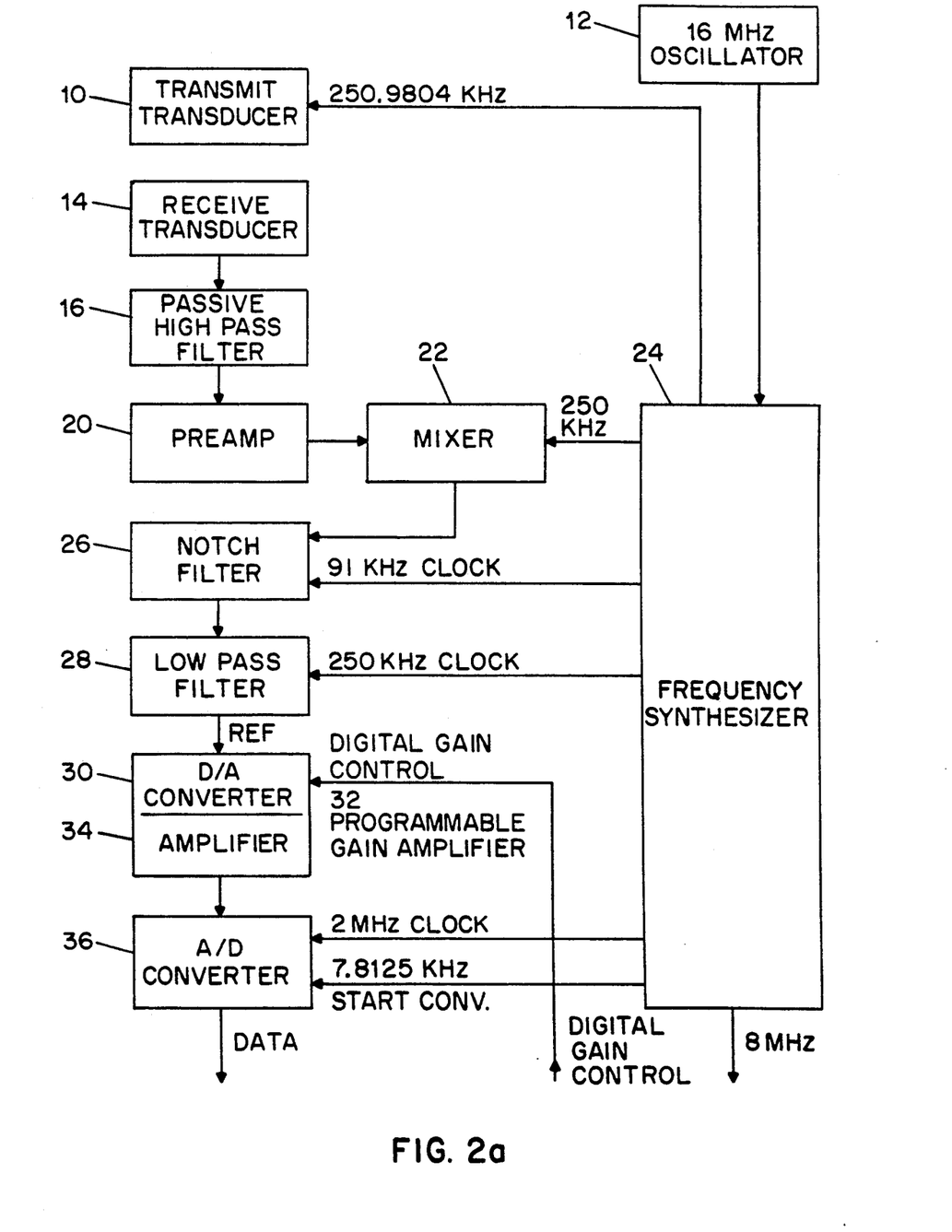
FIGS. 2a and 2b show an electrical block diagram of the system of this invention.

Referring first to FIG. 1, an emitting ultrasonic transducer 9 is positioned in housing 10 near the bottom of a sewer, storm, or storm-sewer pipe 8, being driven by a signal from frequency synthesizer 24, shown in FIG. 2a, and of a frequency of 250.9804 KHz. Typically, it propagates a signal generally longitudinally through a fluid 11.

Frequency synthesizer 24 is driven by 16 MHz pulse oscillator 12, and, in addition to the 250.9804 KHz signal, frequency synthesizer 24 provides a number of additional frequencies as required for the operation and control of the system. All of the frequencies provided by frequency synthesizer 24 are derived from the same 16 MHz clock and are therefore synchronous or coherent in nature. As a result, the system has a substantially improved capability of the detection processing of reflected Doppler signals of quite weak amplitudes.

Receive transducer 13, positioned alongside transmit transducer 9 in pipe 8, senses the various echoed signals; and by virtue of the velocity effects on them, they appear as signals differing from the frequency of the transmitted signal of 250.9804 KHz, being of a higher frequency (as shown) for flow toward the received transducer and of a lower frequency for flow away from it. The output of receive transducer 14 is passed through a simple R.C. type high-pass filter 16 which rolls off such as to remove any signal noise which may be present below a band around 250 KHz of interest. As the C or capacitor of the high-pass filter is in series with its output, this particularly prevents the passage of any non-informational low frequency signals.

The output of high-pass filter 16 is then fed to preamplifier 20 which amplifies a typically quite low level output from transducer 14, the output of preamplifier 20 being adjusted to have a peak-to-peak output as required by mixer 22 to which this output is fed. Mixer 22 is also fed a fixed clock signal of exactly 250 KHz from frequency synthesizer 24. Mixer 22 is a conventional four-quadrant multiplier-type mixer, and it functions to provide as an output a difference signal between the input signal and fixed clock signal of 250 KHz which is thus always equal, frequencywise, to a predetermined offset of 980.4 Hz plus a zero, positive or negative, Doppler shift, depending upon the velocity of flow of a debris source or sources D giving rise to an echo or echoes. This Doppler frequency shift is still very difficult to observe directly at the output of mixer 22. To understand this difficulty, it is well to regard the 980.4 Hz offset frequency as a carrier signal.

Significantly, with respect to the carrier signal, the Doppler shift, if present, serves to frequency modulate, or shift, it about its 980.4 Hz center frequency. However, at the output of mixer 22, the relative amplitude of the carrier is at least 100 times greater than any Doppler shifted frequencies which may be present along with it. This amplitude dominance of the carrier directly results from the close physical proximity of the transmit and receive transducers 9 and 13, respectively, which, while acoustically insulated, are housed in the same enclosure. The large relative amplitude of the carrier center frequency tends to effectively mask out, obviously weaker, signal echoes, particularly those from slowly moving objects as they will be represented by frequencies quite close to the carrier signal.

Significantly, the debris D providing the reflected signals, while moving with the fluid and thus providing velocity signals, often moves at different velocities by virtue of the fact that different portions of fluid moving in a pipe or other containment vessel vary in velocity, as discussed above. Therefore, multiple echoes are returned, as shown, to the receive transducer. This results in corresponding multiple Doppler signals which, combined, form a complex time domain signal or waveform as shown in FIG. 3, which the applicants have found does not lend itself directly to discrete velocity analysis.

Next, and in order to diminish the carrier effect, the output of mixer 22 is fed through an attenuating notch filter 26 which provides dramatic attenuation at the 980.4 Hz center or carrier frequency now present while simultaneously passing frequencies close on either side of it, these representing Doppler shift signals. Actually, notch filter 26 consists of two filters cascaded, that is, in series. One of the filters is a high-pass filter with a sharp roll-off at just above the carrier frequency, and the second filter is a low-pass filter with an equally sharp roll-off just below the carrier frequency. These filters are typically of the conventional capacitor-switched type and are switched by a 91 KHz signal from frequency synthesizer 24.

Figure 3:
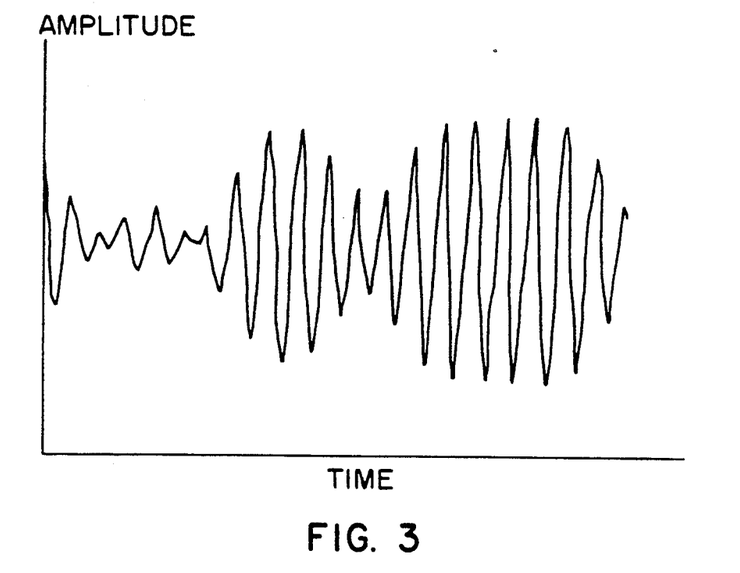
FIG. 3 is a plot of a time domain representation of the received signal after initial processing and as it might appear in memory 38.

By virtue of notch filter 26, Doppler signals are effectively separated from the carrier signal, these being represented by the complex time domain waveform of FIG. 3 which typically contains a group of Doppler shifted signals which have varying frequency and phase relationships. Alternately, notch filter 26 may be omitted, as indicated by dashed lines on notch filter 26, if a high resolution A/D converter, say on the order of a 15 bit device, is used, as will be described.

The output of notch filter 26, if used, is fed through low-pass filter 28 which is employed as an anti-aliasing filter and functions to limit the bandwidth of all signals to between 0 Hz and approximately 2,500 Hz, the range of interest and a compatible range for signal handling by A/D converter 36. This filter functions to prevent aliasing by sharply rolling off any frequency content above 2500 Hz and is a capacitor switch filter controlled by 250 KHz control signals supplied from synthesizer 24.

Next, the output of low-pass filter 28 is fed to the reference input of D/A converter 30, and the output of D/A converter 30 is fed to the input of amplifier 34. D/A converter 30 and following amplifier 34 make up a programmable gain amplifier 32 which effect either gain or attenuation as a function of a digital control signal derived, as will be explained. The output of programmable gain amplifier 32 is fed to a conventional A/D converter 36, the sampling from, and output of, being controlled by 2 MHz and 7.8125 KHz signals from frequency synthesizer 24. The latter frequency is the sample rate of A/D converter 36, and its output is fed to time domain memory 38 of digital signal processor 66, shown in FIG. 2a. As stated, a high resolution A/D converter, such as a 15 bit device, may be used for A/D converter 36, which would obviate the need for notch filter 26. In this instance, the higher resolution provides more dynamic range, allowing detection of all constituent components of the signal.

Figure 2B:
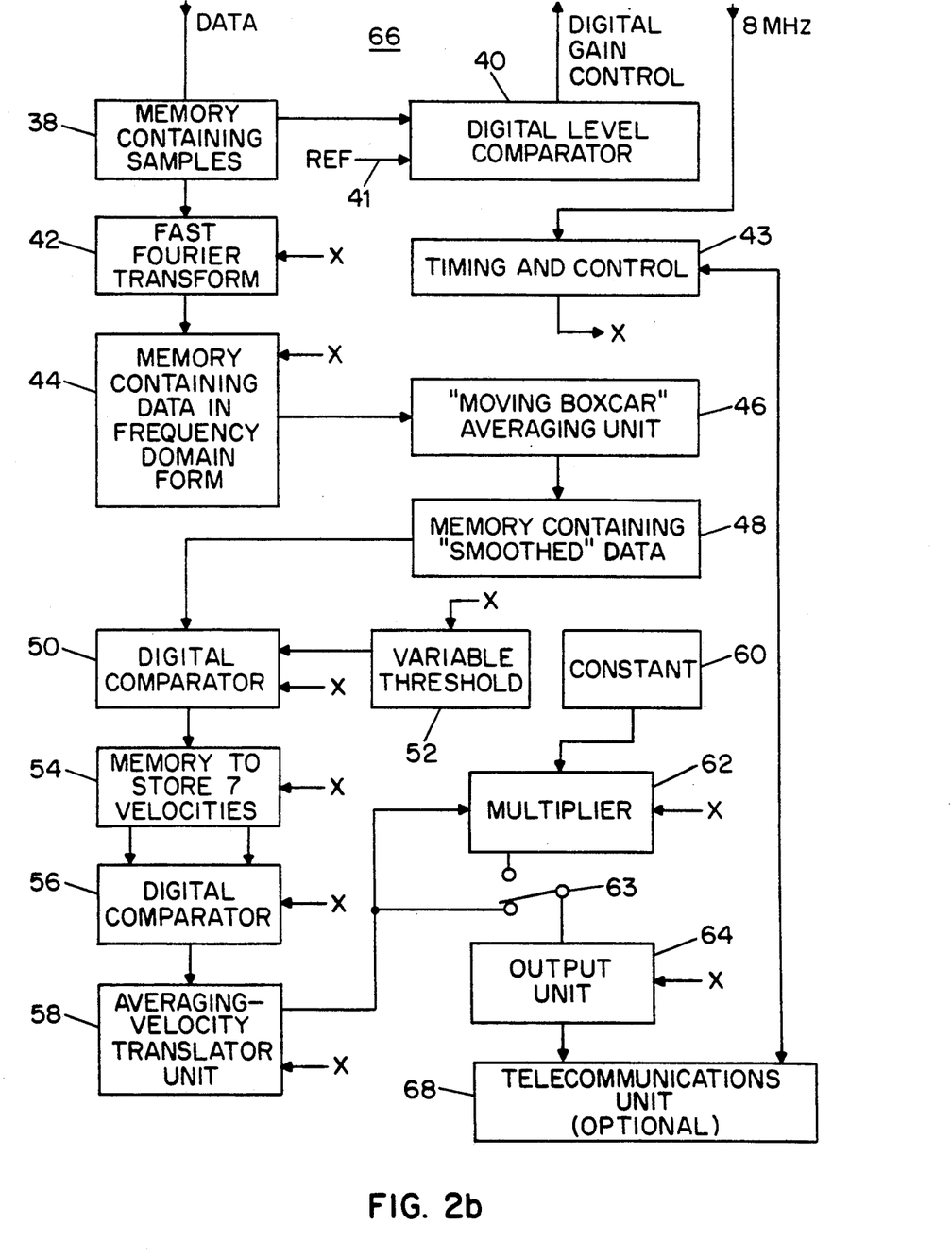

Digital signal processor 66 transforms a continuously updated signal train made up of a composite of received Doppler signals into a signal representative of the average velocity of flow being monitored. All of the signals processed within digital signal processor 66 are represented in binary word form. In addition, digital signal processor 66 monitors the amplitude of the signals being supplied it and provides a digital feedback loop to D/A converter 30 to maintain the range of signal amplitude supplied memory 38 to within a desired amplitude range for further processing. To accomplish this, digital level comparator 40 monitors the peak voltage as represented by a binary value in memory 38. If the peak voltage exceeds approximately 80% of the full scale range as fixed by digital threshold reference value 41, then the output gain is reduced by a fixed percentage. This process is repeated until the input voltage does not exceed the threshold.

The processor elements of digital processor 66 are timed and controlled by conventional timing and control circuitry 43, in turn controlled by a master 8 MHz signal from frequency synthesizer 24. Typically, timing and control 43 would be within, or controlled by, a microprocessor, as in the case of other elements of the system. The control is symbolized by X labeled outputs of timing and control 43 and X inputs of the other components of the system as shown.

FIG. 3 is a plot of amplitude versus time of a signal train, for example, of 150 samples, contained in memory 38, thus illustrating the composite Doppler signals in conventional time domain form.

Figure 4:
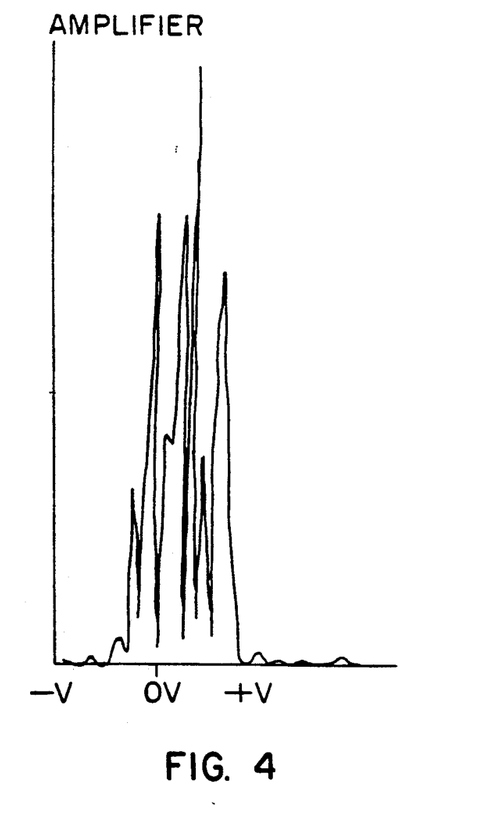
FIG. 4 is a plot of amplitude versus frequency after a Fast Fourier Transform as it might appear in memory 44.
Figure 5:
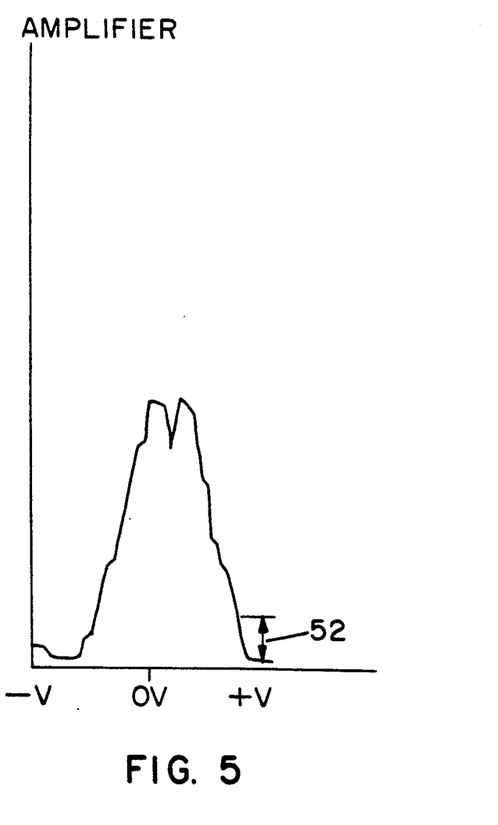
FIG. 5 is a plot of a smooth version of the waveform of FIG. 4 as it might appear in memory 48.

As a feature of this invention, the time domain waveform, now in memory 38, is supplied, sample by sample, from memory 38 to Fast Fourier Transform unit 42. The Fast Fourier Transform unit 42 translates the time domain waveform, sample by sample, to a frequency domain one, as illustrated in FIG. 4 where frequency is plotted versus amplitude. The frequency domain waveform is stored in frequency domain memory 44. Each memory address corresponds directly to a discrete frequency, and each memory location is supplied and contains a numerical value representing the relative amplitude of that particular frequency. In this manner, we obtain discrete signals representative of a group of particular frequencies and thus velocities. The group is then representative of a frequency spectrum. The discrete component frequencies within this spectrum typically exhibit a high degree of amplitude variance. As a means towards reliably determining the peak frequency, or near peak frequency, the curve of this data in frequency domain memory 44 is "smoothed" by averaging unit 46 using a process known as a "moving boxcar averaging", and the result is shown in FIG. 5. In this averaging process, the first 10 amplitude values stored in frequency domain memory 44 are averaged, resulting in a new average amplitude value, which is then stored in the fifth location of memory 48. Next the 2nd ... 11th amplitude values in frequency domain memory 44 are averaged, and this result is stored in the sixth location of memory 48. This process continues in a successive manner with the averaging of the 3rd ... 12th, 4th ... 13th, ..., (n−9) ... nth amplitude values found in memory 44. The process is completed when all results have been stored in memory 48. Memory 48 is arranged such that memory locations are assigned on a progressive frequency basis, for example, the first memory location would contain the amplitude of the lowest anticipated frequency, for example, 480.4 Hz, whereas the last memory location would store the amplitude of the highest anticipated frequency, for example, 2480.4 Hz. This frequency range corresponds to a velocity range of −5 feet per second to +15 feet per second.

As a feature of this invention, the applicants are seeking to identify the highest, or a selected near highest, frequency, for example, 0.9 of the highest frequency. This selection is made by examination from low to high of the stored frequencies; and where a dropout occurs, that is, there is no frequency component present, it can be assumed that we have just passed the highest frequency present.

One example of a system for determining such a selection is described as follows. First, selection is assisted by digital comparator 50 which progressively is furnished amplitude outputs as described from memory 48. A variable or controllable binary word reference value is also provided digital comparator 50, this being from variable threshold source 52. For example, taking into account that there probably will always be some noise level which should be ignored, this reference would be of at least a minimum value such that when it is compared with an amplitude value from memory unit 48, an accurate indication of real frequency cutoff is indicated by the comparison process of digital comparator 50. Similarly, where any desired percentage, for example, 90% of peak velocity sensed, is desired as a readout, the value of variable threshold 52 would be adjusted accordingly. The cutoff criteria for such a percentage point would be determined as follows.

In order to accurately identify the peak velocity present in the flow, we must be able to select a low amplitude high frequency component within an environment of low amplitude noise as illustrated in the rightmost portion of the graph of FIG. 5. To determine the exact point where the signal ends and the noise begins, we use variable threshold 52. By adjusting the threshold at some critical value, we can discriminate between ambient noise and the highest present frequency component which directly represents the peak velocity. Because of the inherent noise factor, it may not be possible to reliably select the absolute highest frequency. However, by downwardly adjusting threshold 52, we can reliably select some frequency which is marginally less than the absolute high frequency corresponding to peak velocity of flow. This selected value, if chosen, is highly representative of the absolute peak velocity of flow. Since the average velocity of flow is approximately 0.9 of the peak velocity, we can obtain, by further downward adjustment of threshold 52, a reliable and reproducible means of determining average velocity of flow. The adjustment of variable threshold 52 can be performed manually in the field or remotely by a central computer via telecommunications unit 68 and timing and control 43.

It should be noted at this point that Doppler frequencies and velocities have been directly related based on signal paths being generally parallel with the direction of flow as illustrated in FIG. 1. In the minority of cases, where one encounters relatively full flows in relatively large pipes, signal propagation may be at some significant angle with respect to the line of direction of flow. In such case, two compensation approaches are possible. In one, variable threshold 52 would be adjusted upward, and in the other, averaging-velocity translation unit 58 would provide an adjustable translation factor. In both cases, the adjustment would be in terms of the cosine of the angle below the line of signal propagation and line of flow.

The process just described of determining peak or near peak velocity value is repeated, for example, six times, to provide a total of seven velocity values as determined by digital comparator 50 under the control of timing and control 43. These seven velocity values are stored in memory 54. Then, as a further means of enhancement of accuracy, likely spurious, anticipated out-of-range or other extraneous measurements are discarded as determined by digital comparator 56, capable of cross-comparing all samples in memory 54. For example, the two extreme value samples would be discarded, and the remaining five measurement samples are averaged, this process being accomplished by averaging-velocity translator unit 58 to provide a selected velocity average value under the control of timing and control 43. In addition, unit 58 performs the actual translation from frequency in units of Hertz to velocity as represented in units of feet per second.

At this point, the output of averaging-velocity translator unit 58 may be alternately treated. In the event that a less-than-maximum velocity signal is chosen as a threshold selection from variable threshold unit 52, the output of unit 58 will be in average velocity flow terms, and no further processing is needed. In such case, switch 63 would be positioned in the lower position wherein the output of unit 58 would be fed directly to output unit 64. This less-than-maximum velocity signal would reflect a fluid flow average velocity in terms of a chosen percentage of the peak velocity present.

Alternately, where the variable threshold is set to select the peak velocity signal, and the output of averaging unit 58 would reflect this, switch 63 would be positioned in the upper position wherein the output of averaging unit 58 would be supplied as one input to multiplier 62, in which case a reference value from constant unit 60, for example, a multiplier of 0.9, would be supplied from it as a second input to multiplier 62. By this approach, the average velocity signal is provided from the output of multiplier 62 to output unit 64.

Output unit 64 would, for example, be either a binary readout or simply an ASCII character string representation of the average velocity signal. Where simply a value, or where, in addition to other readouts, a value is present, representative of average velocity, it typically would be provided to a telecommunications unit 68 whereby the system as a whole would be controllable from a remote location via a telephone line or other communications carrier. Thus, the system may be maintained in a low power standby mode until it receives a "wakeup" call to initiate a fluid flow measurement by timing and control 43 to which telecommunications unit 68 is connected. The results of measurements may thus be returned.

Alternately, the results of a measurement can be stored in telecommunications unit 68 for later return by any of the above methods. Additionally, the telecommunications unit 68 is capable of receiving commands from a central computer site for the purpose of remotely configuring the velocity sensor unit or, optionally, dumping selected memory contents for further analysis via control of timing and control 43.

Figure 6:
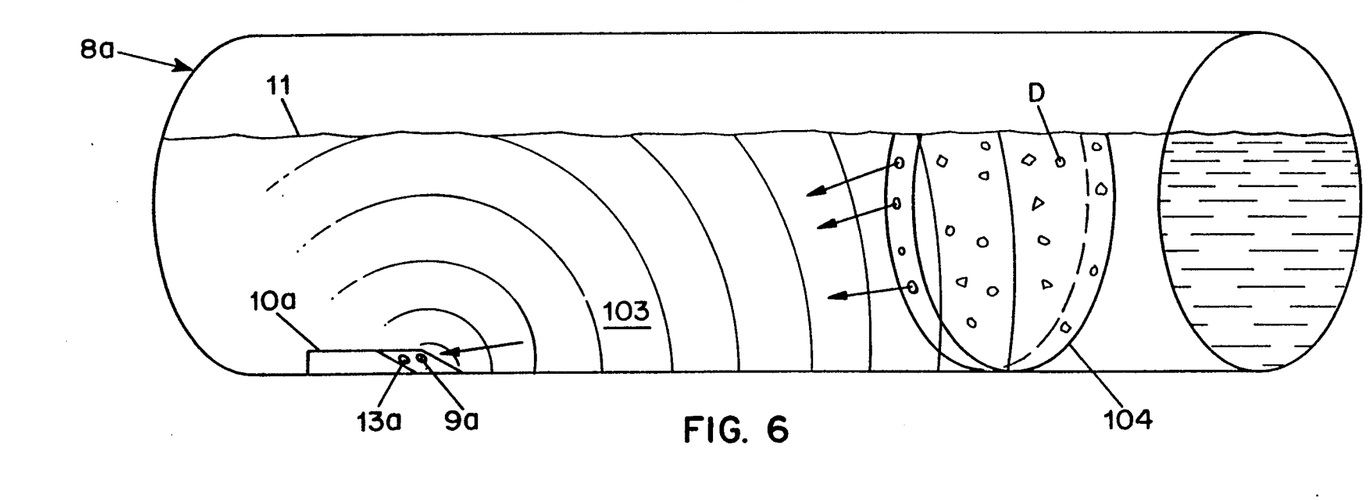
FIG. 6 is a schematic illustration of the employment of a pulsed embodiment of the invention showing a planar volume of moving fluid from which return signals are received.
Figure 7A:
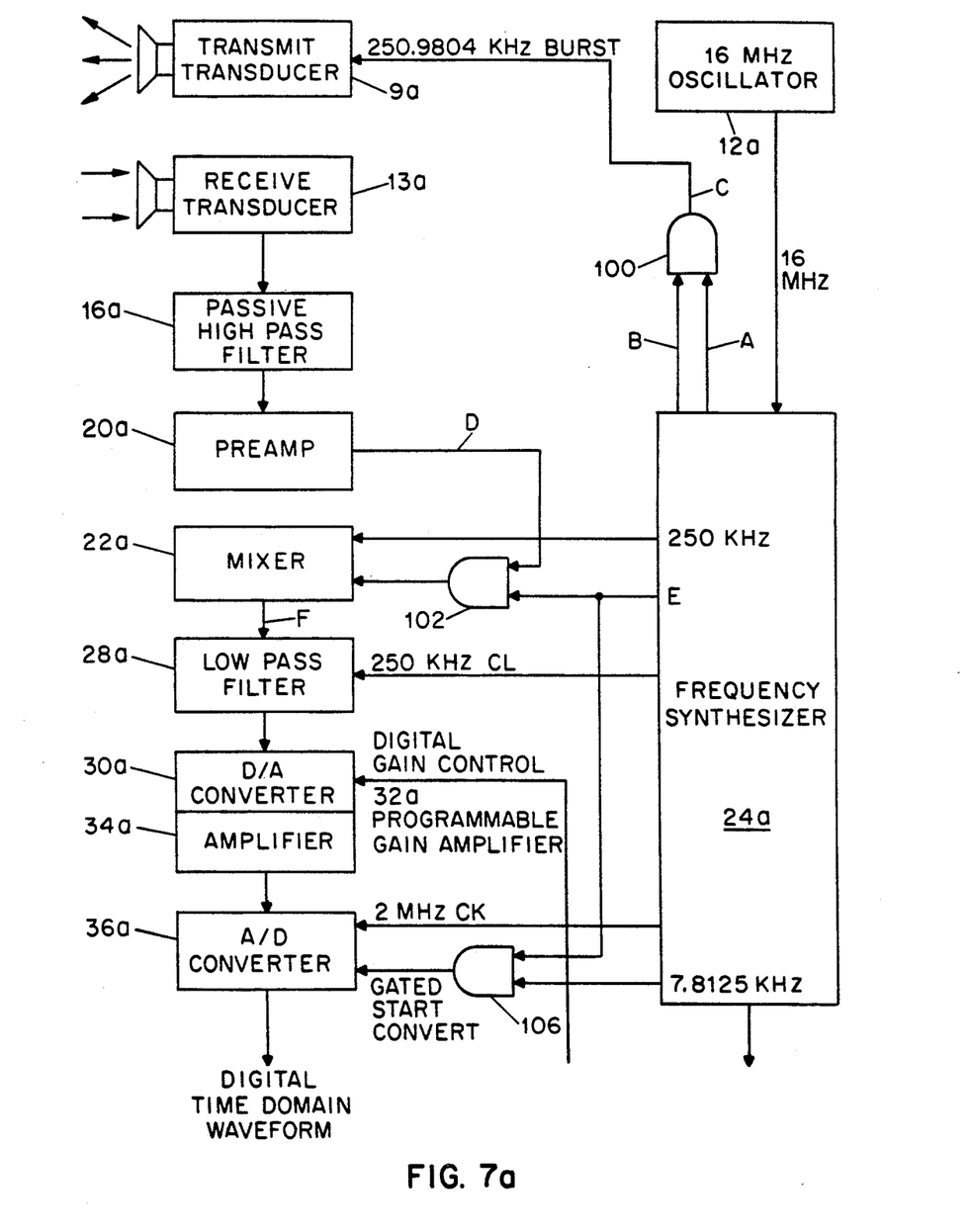
FIG. 7a and 7b illustrate an electrical block diagram of the pulsed embodiment of the invention.

As an alternate embodiment to the system described above, FIGS. 6, 7a and 7b, 8, and 9 illustrate a system wherein the 250.9804 KHz signal from transmit transducer 9a is a gated signal, meaning that the transmitted signal is a burst, or pulsed signal having frequency components. In this system, the 250.9804 signal, which may be a sine wave, as shown in waveform A of FIG. 8, is applied to one input of a conventional analog switch or gate 100 (FIG. 7a), with a gating pulse (waveform B) from systhesizer 24a applied to the other input of gate 100. This generates waveform C, which is emitted from transmit transducer 9a. Significantly, the duration of waveform C is set to pass a selected number of discrete sine waves, 250 being passed herein by way of example, and only 4 being shown in waveform B due to space considerations, so that each set of 250 sine waves passed by analog gate 100 constitutes a discrete signal pulse of 250 sine waves emitted from transmit transducer 9a. As the pulse of sine waves spreads into a broad beam 103 (FIG. 6) and propagates outward longitudinally through the moving fluid in pipe 8a, echoes of the sine waves are reflected back to a receive transducer 13a for a duration of time determined by the energy of the transmitted pulse, as shown by waveform D. Naturally, echoes from debris close to transmit transducer 9a produce stronger return echoes in a shorter period of time than debris farther away, which produce weaker signals in a longer duration of time, meaning that due to the aforementioned coherent nature of the signals and high density of debris in the fluid, the echoes merge into basically a continuous waveform D that decreases in amplitude with time and posseses a Doppler shift. As stated, receive transducer 13a senses the reflected signals, which are of a higher frequency for flow toward the receiver and of a lower frequency for flow away from the receiver.

The output of transducer 13a is applied to the high-pass filter 16a (FIG. 7a), which functions as described to remove signal noise below about 250 KHz. This filtered output from high-pass filter 16a is applied to preamplifier 20a, which also functions as described to provide an amplified and filtered waveform D. This waveform D is applied to one input of analog gate 102, gate 102 being a like gate to gate 100. The other, gating input of analog gate 102 is provided by synthesizer 24a, labeled as waveform E in FIG. 8. Notably, waveform E occurs a discrete duration after a pulse of sine waves is transmitted, and is of a selected duration, with these two durations being adjustable by means not shown. The first duration is selected to correspond to a distance, typically about twice the pipe diameter transducers 9a and 13a are positioned in, at which a wavefront of the transmitted signal pulse becomes less concave and begins to approximate a planar surface. The second duration, the actual duration of gating pulse E, is selected, in this example, to be the same width as gating pulse B, so that about 250 received sine waves (only 4 shown) are passed to mixer 22a. Thus, the received, Doppler shifted signal amplified and output from preamplifier 20a is derived from debris moving through a volume of fluid 104 (FIG. 1) of a discrete thickness, with about 250 received sine waves representing a thickness of fluid in pipe 8a of about 2.5 feet, and being a selected distance from transmit and receive transducers 9a and 13a. This technique eliminates any masking effect of the weaker, received signals by the stronger, transmitted signals that may occur due to the physical proximity of the transmit and recieve transducers, and allows average flow velocity to be measured directly.

Mixer 22a is also provided, as described above, with the 250 KHz signal, which is used as described to remove the 250 KHz signal from the received signal and output a 980.4 Hz signal offset by the Doppler shift, the extent of this shift determined by the velocity of debris particles. Since the input of mixer 22a is gated by a pulse corresponding to a width of about 250 of the transmitted 250.9804 KHz sine waves, and the output of mixer 22a is of a much lower frequency, about 980 Hz, about a single sine wave (waveform F) will be output from mixer 22a. This sine wave will not yield accurate frequency domain waveforms indicative of average velocity when applied to Fast Fourier Transform unit 42a (FIG. 7b), necessating that many samples be taken and concatenated, as will be explained.

Figure 7B:
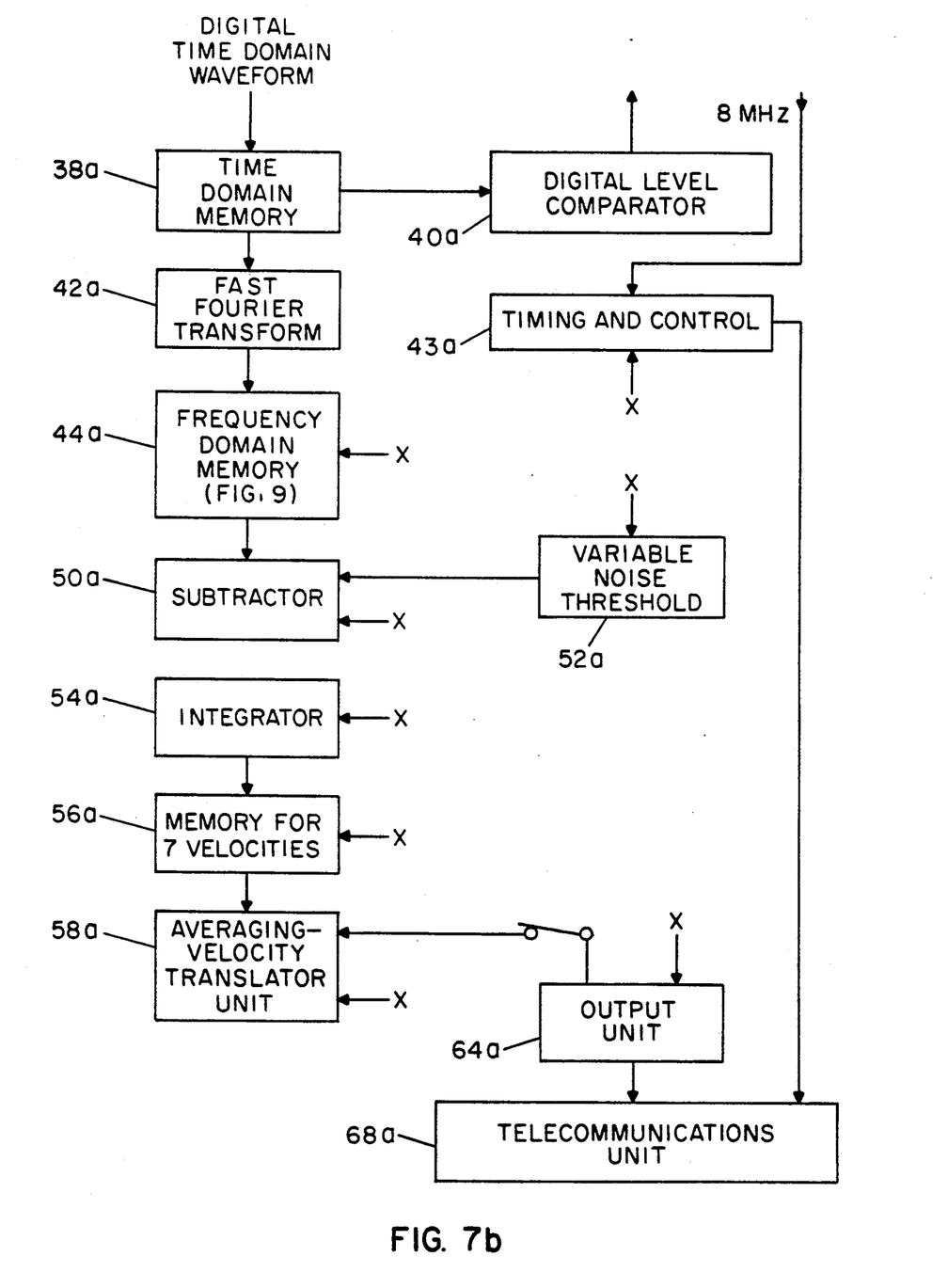
Figure 8:
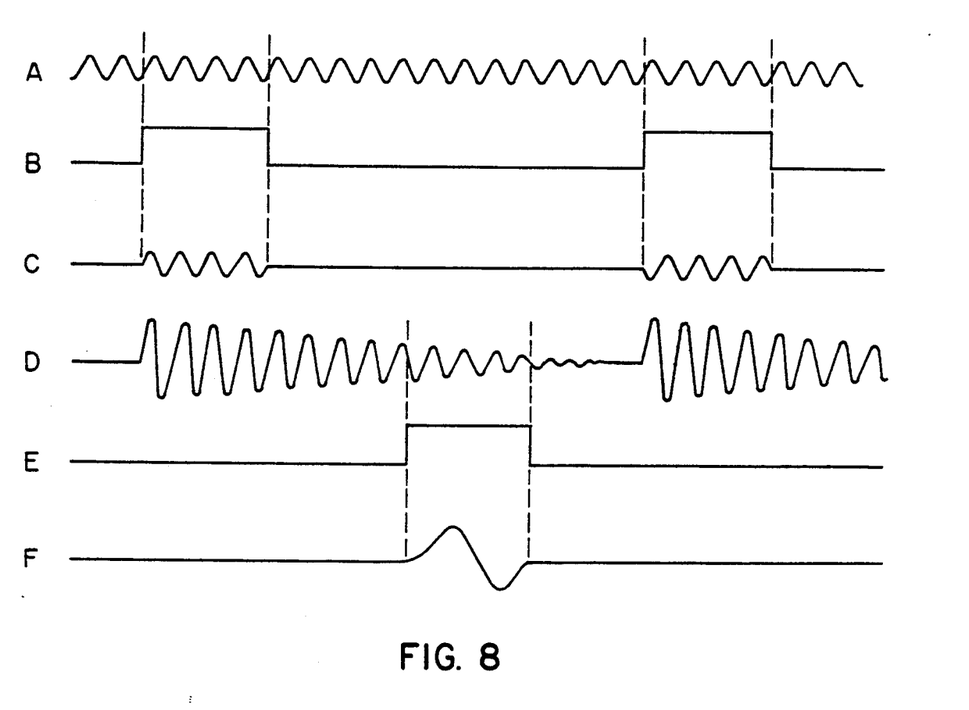
FIG. 8 is a timing diagram of waveforms A–F showing timing relationships and illustration operation of the pulsed embodiment.
Figure 9:
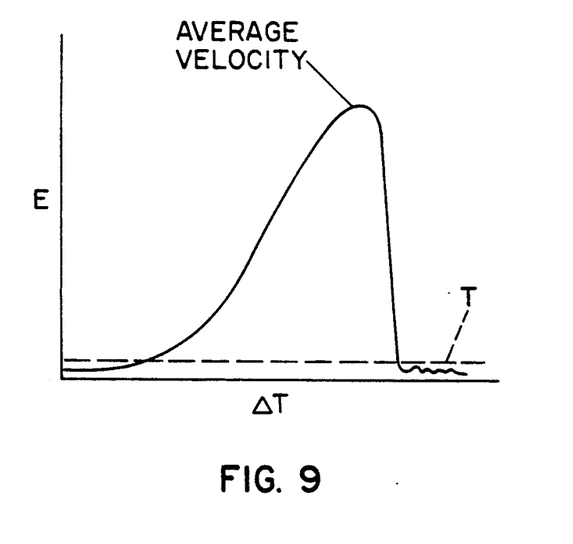
FIG. 9 is a plot of a signal as it might appear in memory 44a after a Fast Fourier Transform has been performed on a received time domain signal.

The Doppler shifted sine wave from mixer 22a is applied to low pass filter 28a (FIG. 7a), which functions as described to prevent aliasing by sharply rolling off any frequency content above 2500 Hz, after which the signal is applied to programmable gain amplifier 32a, which also functions as described to effect gain or attenuation of the signal responsive to a digital control signal from digital level comparator 40a (FIG. 7b). Next, the sine wave is applied to A/D converter 36a, a high resolution device on the order of a 15 bit device, and driven by a sampling signal from synthesizer 24a of about 7.8125 KHz. This sampling signal is applied to one input of AND gate 106, the other input thereof being coupled to waveform E applied to mixer 22a. Thus, A/D converter 36a is gated to digitize the approximately 980 Hz sine wave of waveform F at a frequency of 7.8125 Khz, outputting a high resolution digital signal representative of the sine wave. This digital signal is stored in time domain memory 38a (FIG. 7b) along with a number of sequentially stored samples obtained as described, generally on the order of 2048, which is belived to be sufficient samples to produce the required frequecy/velocity resolution. By virtue of the aforementioned gating techniques, only samples of intrest are stored, namely that portion of waveform D gated to mixer 22a by waveform E, so that when the samples are read out of time domain memory 38a, they become concatanated into a single composite waveform. This waveform is then applied to Fast Fourier Transform (FFT) unit 42a in digital signal processor 66a, which translates the composite signal as described to a frequency domain form as shown in FIG. 9 having a range from about 480.4 Hz to about 2480.4 Hz, corresponding to a velocity range of −5 feet/second to +15 feet/second. These frequency values are stored in memory 44a of signal processor 66a. Signal processor 66a includes timing and control 43a, which functions as described to control elements of the system. Additionally, digital level comparator 48a provides a digital gain control signal to programmable gain control amplifier 32 to maintain the amplitude of the signal within a desired range as described.

Next, the frequency domain signal from memory 44a is applied to subtracting unit 50a, which subtracts a variable noise threshold value stored in variable noise threshold-register 52a from the frequency domain signal. This eliminates most, if not all, low amplitude electronic noise components from the frequency domain signal stored in memory 44, as shown by dotted line threshold T of FIG. 9. The signal is then passed to integrating unit 54a, which integrates the data to compensate for effects due to the received signals returning from a volume of fluid which is slightly curved as described to produce an average velocity signal, with this average velocity signal stored in velocity memory 56a. After 7 average velocity measurements are stored in memory 56a, averaging-velocity translator unit 58a averages the 7 measurements and passes the average of these to output unit 64a, cross-comparing and disgarding spurious out-of-range measurements as described. As stated, output unit 64 may be either a readout, or a representation of the average velocity signal which may be provided to telecommunications unit 68 controllable via a remote location, such as over a telephone line, over which the results from averaging-velocity translator unit 58a may be transmitted.

While specific frequencies and sizes of samples have been provided in the last-described embodiment, it is to be understood that other frequencies and sample sizes may be utilized without departing from the principles of this invention.

By the systems thus described, there are provided fluid velocity measurements that are significantly more accurate and reliable than results previously obtained, actually, to within 0.04 feet per second. It is to be noted that as a function of the Doppler shift frequency spectrum, the velocity or flow rate may be positive, negative, or zero. It has been observed that a given reflected frequency will be shifted by approximately a positive 100 Hz for every foot of approaching fluid velocity (water as the fluid medium), and negative fluid velocity will result in a corresponding approximate negative 100 Hz frequency shift.

While as illustrated the present system determines the presence of discrete frequencies by a Fast Fourier Transform, one might detect the generally multiple frequencies present by another form of spectrum analysis, such as by employment of an array or multiplexed frequency tuned phase lock loops or discrete filters. The significant thing is that the multiple echoes involved in processing signal flow will be taken into account as providing a total picture of velocities from which a velocity selection may be made as described.

We claim:

1. A sewer flow velocity measurement system comprising:
   acoustic emission means disposed within a sewer for transmitting broadly directed bursts of an acoustic signal, said bursts having a discrete duration and frequency, into a volume of moving fluid in the sewer;
   acoustic reception means including a transducer, and gated to receive a selected portion of Doppler shifted signals from fluid borne objects in a discrete volume of fluid at a discrete distance, said Doppler shifted signals comprising a plurality of time domain signals,
   frequency domain translation means responsive to said selected quantity of said time domain signals, for translating said time domain signals into a plurality of frequency domain signals; and
   velocity computation means responsive to said frequency domain translation means for providing as an output a signal representative of an average velocity of said fluid flow.

2. A fluid flow velocity measurement system as set forth in claim 1 wherein said acoustic emission means and said acoustic reception means each comprises an acoustic transducer positioned within said fluid and generally positioned for transmission and reception of signals having a significant component along the line of direction of flow.

3. A system as set forth in claim 1 wherein said frequency domain translation means comprises means for effecting a Fast Fourier Transform from said time domain signals.

4. A system as set forth in claim 2 wherein said acoustic reception means includes means for maintaining a level of said Doppler shifted signals within a selected amplitude range.

5. A system as set forth in claim 4 wherein said acoustic reception means includes:
an acoustic-electrical transducer;
first gating means responsive to a gating signal occurring a predetermined interval after completion of one of said bursts of acoustic signal, for passing as an output responsive to said gating signal said selected portion of Doppler shifted signals,
mixing means responsive to said gating means for mixing said portion of acoustic signal with a signal of selected frequency, eliminating frequency components of said acoustic signal from said selected portion and passing Doppler shifted signals as an output,
a programmable gain amplifier responsive to said mixing means and disposed for providing as an output amplitude stabilized signals, and having a reference input connected to the output of said mixing means and having a digital control input,
second gating means responsive to said gating signal and to a sampling signal, for providing a gated said sampling signal as an output responsive to said gating signal,
a digital-to-analog converter having a reference input connected to the output of said mixing means and having a digital control input,
an analog-to-digital converter having an input responsive to said gated sampling signal, wherein said analog-to-digital converter samples said amplitude stabilized signals only during said predetermined interval after completion of said burst of acoustic signal, and
control means responsive to the output of said analog-to-digital converter for providing an input to said digital control input to said digital-to-analog converter, whereby the level of the output of said digital-to-analog converter is controlled.

6. A fluid flow velocity measurement system as set forth in claim 2 wherein said velocity computation means comprises averaging means coupled to said frequency domain translation means, for obtaining a plurality of said frequency domain signals representative of a plurality of said selected portions and effecting an average of said last-named signals and providing as an output an average velocity of fluid flow.

7. A sewer flow velocity measurement system comprising:
acoustic emission means disposed within a sewer for transmitting an acoustic signal of a discrete frequency and being a generally broad beam, into a volume of moving fluid in the sewer;
acoustic reception means including a transducer positioned to receive a plurality of Doppler shifted signals related to said acoustic signal from fluid bourne objects, and said Doppler shifted signals being received over a discrete time interval and comprising a time domain signal train;
detecting means responsive to said time domain signal train for detecting Doppler frequency shifted signals;
frequency selection means responsive to said detecting means for selecting a frequency signal which is related to the range of said Doppler frequency shifted signals; and
velocity computation means responsive to said frequency selection means for providing as an output a signal representative of an average velocity of said fluid flow, being a velocity related to a frequency proximate an end region of said range.

* * * * *